(12) United States Patent
Onishi

(10) Patent No.: US 6,469,767 B2
(45) Date of Patent: Oct. 22, 2002

(54) LIQUID CRYSTAL DISPLAY

(75) Inventor: Hiroaki Onishi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/827,057

(22) Filed: Apr. 6, 2001

(65) Prior Publication Data

US 2001/0030729 A1 Oct. 18, 2001

(30) Foreign Application Priority Data

Apr. 17, 2000 (JP) ........................................ 2000-114951

(51) Int. Cl.$^7$ ............................................ G02F 1/1335
(52) U.S. Cl. ........................ 349/149; 349/151; 349/153
(58) Field of Search ................................ 349/151, 153, 349/149

(56) References Cited

U.S. PATENT DOCUMENTS

| | | | | |
|---|---|---|---|---|
| 4,600,273 A | * | 7/1986 | Ohno | .......................... 349/153 |
| 5,556,670 A | * | 9/1996 | Mihara et al. | ............... 349/153 |
| 5,706,069 A | * | 1/1998 | Hermens et al. | ............ 349/153 |
| 5,946,057 A | * | 8/1999 | Kusanagi | ..................... 349/153 |
| 6,108,057 A | * | 8/2000 | Kusanagi | ..................... 349/153 |

FOREIGN PATENT DOCUMENTS

| | | | | |
|---|---|---|---|---|
| JP | 3-59623 | * | 3/1991 | .................. 349/153 |
| JP | 6-43474 | * | 2/1994 | .................. 349/153 |

\* cited by examiner

*Primary Examiner*—James Dudek
(74) *Attorney, Agent, or Firm*—Morgan, Lewis & Bockius LLP

(57) ABSTRACT

To provide a liquid crystal display wherein means for connecting to transparent electrodes can be prevented from standing out unseemly when the liquid crystal display is turned on without increasing a death area in the periphery of a liquid crystal screen, plural wiring formed on a first transparent substrate are electrically connected to extended parts of transparent electrodes formed on a second transparent substrate via a connection and a part of each wiring passes between the connection and a liquid crystal inclusion body.

12 Claims, 12 Drawing Sheets

LIQUID CRYSTAL DISPLAY

BACKGROUND OF THE INVENTION

1. Field of the Invention

The present invention relates to a liquid crystal display, further detailedly relates to a liquid crystal display using a simple matrix method (a passive matrix method) for a method of driving a liquid crystal.

2. Description of the Related Art

FIG. 11 shows the schematic configuration of a conventional type liquid crystal display using a simple matrix method. In this liquid crystal display, a transparent substrate 90a on which plural perpendicular transparent electrodes 91a are formed and a transparent substrate 90b on which plural horizontal transparent electrodes 91b are formed are mutually opposed and a liquid crystal inclusion body 92 in which a liquid crystal (not shown) is sealed is provided between a pair of these transparent substrates 90a and 90b. As also shown in FIG. 12, a driver 93, plural terminals 94, plural segment wiring 97 for connecting each perpendicular transparent electrode 91a to the driver 93 and plural common wiring 98 for connecting each horizontal transparent electrode 91b to the driver 93 are provided to the transparent substrate 90a.

However, as the plural horizontal transparent electrodes 91b are provided to the transparent substrate 90b, each common wiring 98 cannot be directly led out from each horizontal transparent electrode 91b. Therefore, as shown in FIG. 13, an extended part 91b' acquired by extending one end in the longitudinal direction by a suitable dimension s9 is provided to each horizontal transparent electrode 91b. Also, as shown in FIG. 12, the end 98' of each common wiring 98 opposite to each extended part 91b' is formed. A connection 96 electrically connecting the end 981 and the extended part 91b' is provided as shown in FIG. 11. The connection 96 is formed via anisotropic conductive paste (not shown) between the end 98' of each common wiring 98 and each extended part 91b'.

According to such configuration, voltage can be selectively applied to the respective plural perpendicular transparent electrodes 91a and plural horizontal transparent electrodes 91b by driving the driver 93. Therefore, a desired image can be displayed on a liquid crystal screen formed by the liquid crystal inclusion body 92.

However, the conventional type liquid crystal display has the following problems.

That is, in case the conventional type liquid crystal display is used for a display of a mobile telephone for example, the liquid crystal inclusion body 92 is set so that it can be viewed from the outside via an aperture provided to a case of the mobile telephone. However, in the conventional type liquid crystal display, the connection 96 is provided close to the liquid crystal inclusion body 92. In the meantime, as described above, the connection 96 is a part in which the opaque anisotropic conductive paste is used. Therefore, heretofore, when a user of a mobile telephone sees a liquid crystal screen, the connection 96 comes into a visible area of the liquid crystal screen and it does not look nice.

In the conventional type, to solve only the problem, distance from the liquid crystal inclusion body 92 to the connection 96 has only to be increased. However, when such means is adopted, a problem that the total extrusion width s10 of the plural common wiring 98 on the side of the liquid crystal inclusion body 92 is increased and the periphery of the liquid crystal inclusion body 92, that is, a death area in the periphery of a liquid crystal screen is increased is caused.

SUMMARY OF THE INVENTION

The invention is devised in consideration of such circumstances and the object is to provide a liquid crystal display wherein means for connecting wiring for a transparent electrode can be prevented from standing out unseemly when the liquid crystal display is used without increasing a death area in the periphery of a liquid crystal screen.

To achieve the object, the invention adopts the following technical means.

The liquid crystal display provided by the invention is provided with a liquid crystal inclusion body in which a liquid crystal is sealed between first and second transparent substrates on which plural transparent electrodes are respectively formed, at least one driver mounted on the first transparent substrate, plural extended parts in which the end of each transparent electrode formed on the second transparent substrate is extended outside the liquid crystal inclusion body, plural wiring provided to the first transparent substrate and extended from a location opposite to each extended part to the driver and a connection for electrically connecting these plural wiring to the plural extended parts and is characterized in that a part of each wiring passes between the connection and the liquid crystal inclusion body.

In the liquid crystal display according to the invention, as a part of the plural wiring exists between the connection and the liquid crystal inclusion body, the connection is arranged in a location apart from the liquid crystal inclusion body by a dimension exceeding the width of the plural wiring. Therefore, when a liquid crystal screen formed by the liquid crystal inclusion body is viewed, the connection can be made invisible or can be prevented from standing out. Naturally, each wiring can be prevented from standing out by using the similar material to that of the transparent electrode. In the meantime, as a part of the plural wiring passes between the connection and the liquid crystal inclusion body, the plural wiring can be prevented from being extruded largely on the side of the liquid crystal inclusion body though distance between the connection and the liquid crystal inclusion body is increased to some extent. As a result, in the invention, the liquid crystal display can be made to look nicer without increasing a death area in the periphery of the liquid crystal screen.

In a preferred embodiment of the invention, each wiring has an intermediate part extended in a direction in which the each wiring crosses the plural extended parts and an end extended in a direction reverse to the liquid crystal inclusion body from the intermediate part, and the connection is provided via a conductive substance between the end and each extended part.

According to such configuration, the intermediate part of each wiring passes between the connection and the liquid crystal inclusion body and the configuration intended by the invention can be suitably realized.

In another preferred embodiment of the invention, the width of a part at least opposite to each extended part of the intermediate part of each wiring is made narrower than that of the end of each wiring.

According to such configuration, the intermediate part of each wiring and each extended part can be prevented from being opposite in a state in which both have large area. Therefore, even if an interval between each intermediate part_ and each extended part is minute, unjust electric conduction between these can be prevented. More concretely, when voltage is applied to any of the plural wiring, the application of the voltage can be prevented from having an effect upon the extended part to be naturally insulated from this wiring. Therefore, another preferred embodiment of the invention is desirable to prevent the malfunction of the liquid crystal display.

In another preferred embodiment of the invention, the width of a part at least opposite to the intermediate part of each wiring of each extended part is made narrower than that of a part opposite to the end of each wiring.

According to such configuration, as in case the width of at least a part of the intermediate part of each wiring is made narrow, the intermediate part of each wiring and each extended part can be prevented from being opposite in a state in which both have large area. Therefore, unjust electric conduction between the intermediate part and the extended part can be prevented and another preferred embodiment of the invention is desirable to prevent the malfunction of the liquid crystal display.

In another preferred embodiment of the invention, the array pitch of electrically connected parts between the plural extended parts and the plural wiring is made larger than the array pitch of the transparent electrodes formed on the second transparent substrate.

According to such configuration, the corresponding extended part and the corresponding wiring can easily suitably conduct and can securely conduct.

In another preferred embodiment of the invention, plural transparent electrodes formed on the second transparent substrate are divided into a first group in which one end in the longitudinal direction of them is the extended part and a second group in which the other end in the longitudinal direction of them is the extended part.

According to such configuration, plural wiring that respectively conduct electricity to transparent electrodes in the first group and plural wiring that respectively conduct to transparent electrodes in the second group can be split on both sides of the liquid crystal inclusion body. As a result, a narrow death area is substantially uniformly formed on both sides of the liquid crystal inclusion body and a large death area can be prevented from being formed on only one side of the liquid crystal inclusion body.

In another preferred embodiment of the invention, the driver is provided in a position apart from the liquid crystal inclusion body by an interval in a fixed direction, the plural wiring are provided except a region on one side of the driver in a direction perpendicular to the fixed direction and in the region, plural terminals that receive a signal and power respectively input to the driver. from an external device are provided.

According to such configuration, the plural terminals are provided with them arranged on one side of the driver. Therefore, the efficiency of space for providing the plural terminals is satisfactory and another preferred embodiment of the invention is suitable to reduce a death area in the periphery of the liquid crystal screen.

The other characteristics and advantages of the invention will be clarified from the following description of embodiments of the invention.

DETAILED DESCRIPTION OF THE PREFERRED EMBODIMENTS

Figure 1:
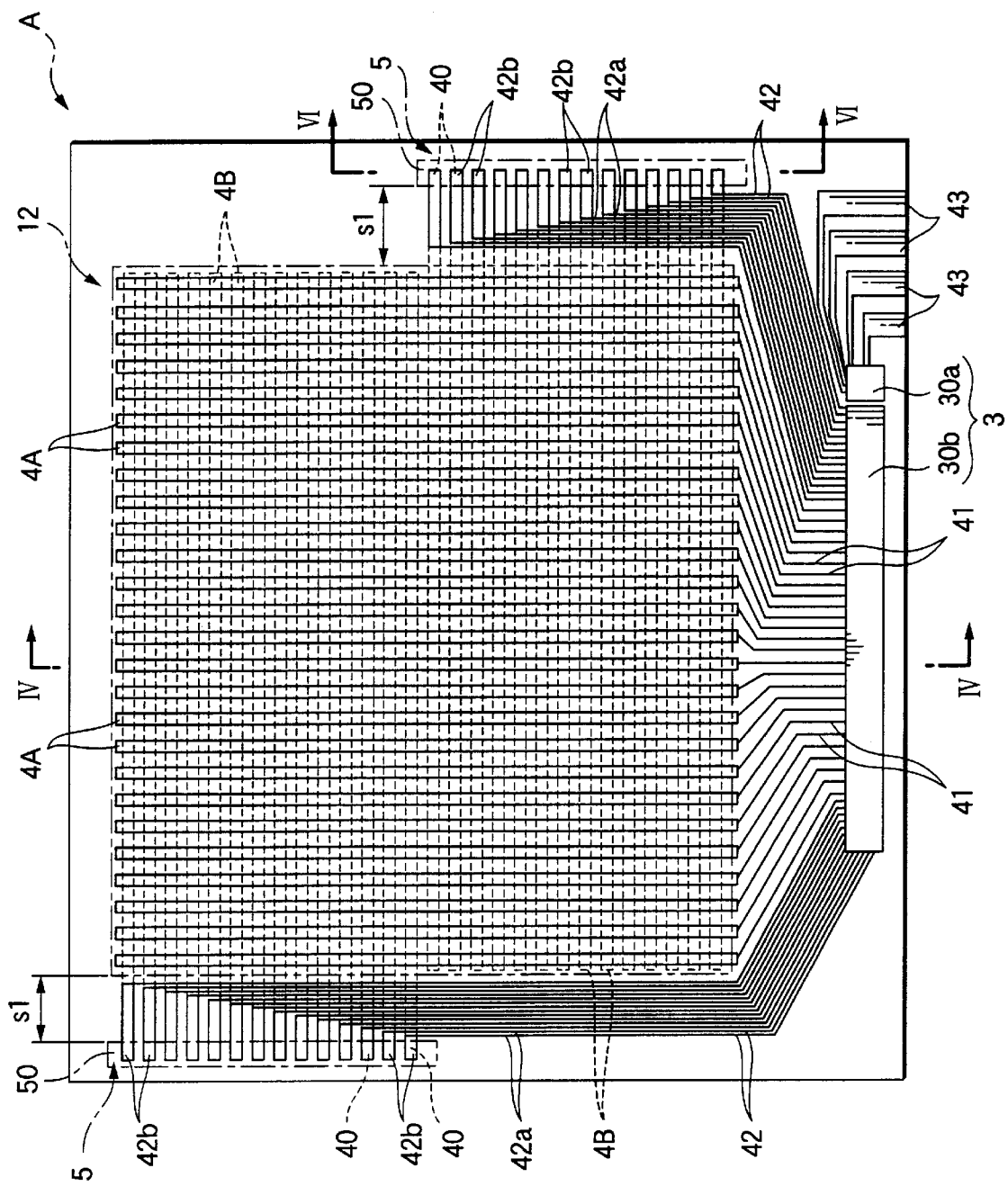
FIG. 1 is a front view showing an example of a liquid crystal display according to the invention.

Referring to the drawings, preferred embodiments of the invention will be concretely described below.

Figure 2:
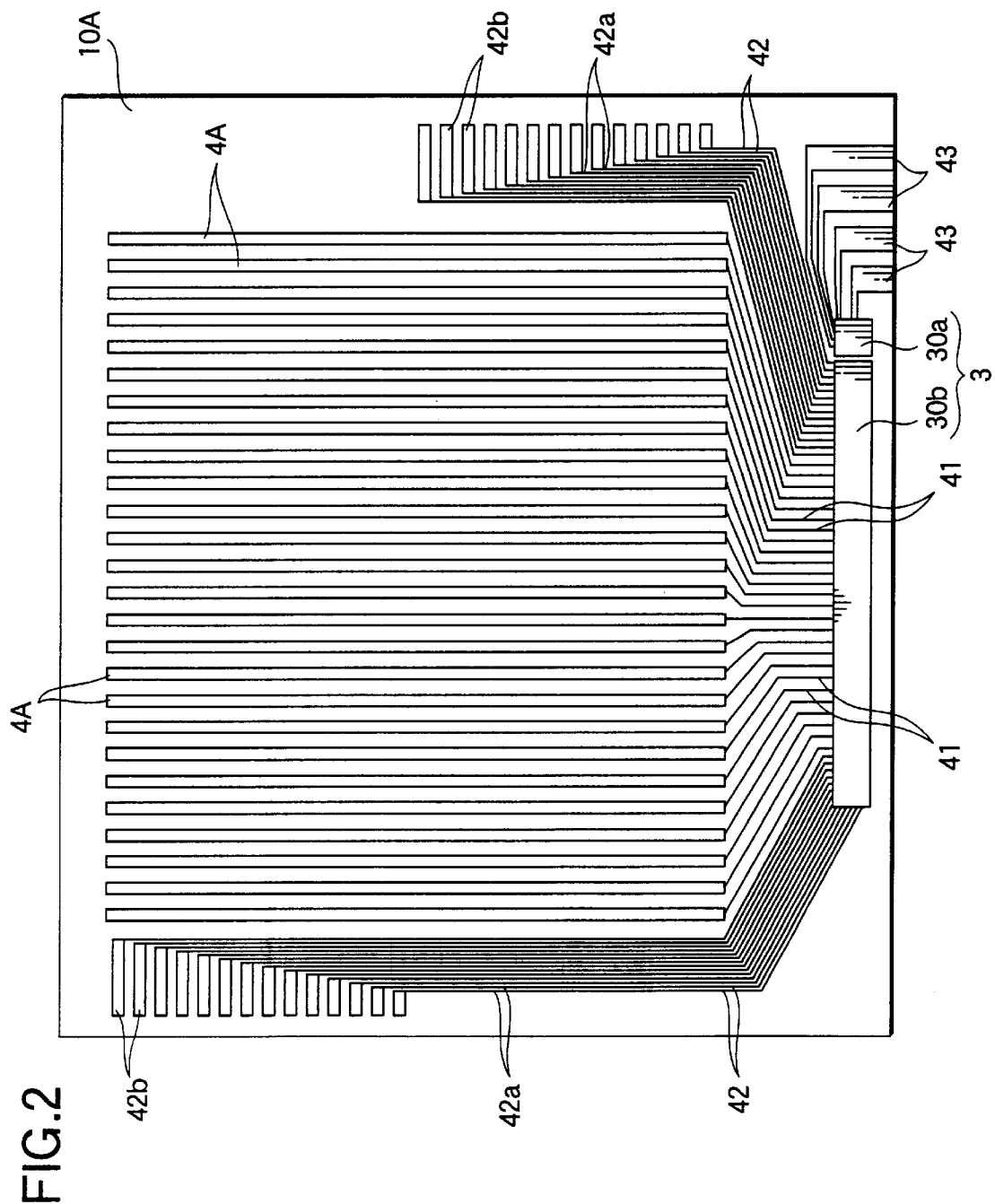
FIG. 2 is a front view showing a first transparent substrate used in the liquid crystal display shown in FIG. 1.

FIGS. 1 to 6 show one embodiment of the invention. In FIGS. 1 and 2, various wiring and mounted components respectively formed on a first transparent substrate are shown according to perspective representation. A vertical direction and a horizontal direction in this embodiment mean a vertical direction and a horizontal direction in each front view shown in FIGS. 1 to 3.

Figure 4:
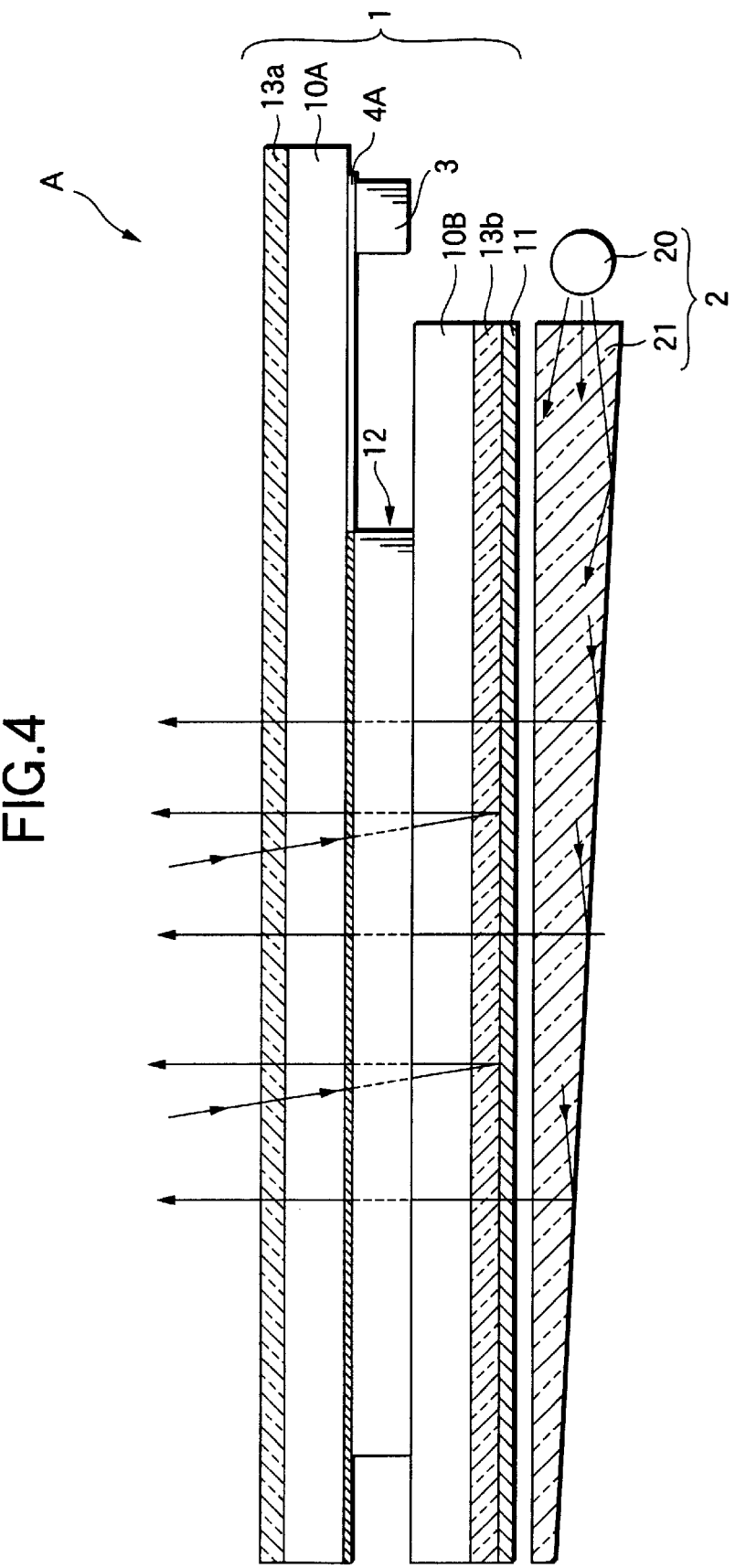
FIG. 4 is a sectional view viewed along a line IV—IV shown in FIG. 1.

As clearly shown in FIG. 4, a liquid crystal display A equivalent to this embodiment is provided with a liquid crystal panel 1, a driver 3 mounted on this liquid crystal panel 1 and a luminaire 2. The luminaire 2 includes a light source 20 and a light conducting plate 21, a nd the liquid crystal display A equivalent to this embodiment adopts a so-called backlight method that the liquid crystal panel 1 is illuminated from the back by the luminaire 2.

The liquid crystal panel 1 is provided with first and second transparent substrates 10A and 10B, a liquid crystal inclusion body 12 including a liquid crystal between the transparent substrates, a polarizing plate 13a arranged in front (on the upside in FIG. 4) of the first transparent substrate A, a polarizing plate 13b arranged at the back of the second transparent substrate 10B and a translucent reflector 11.

The first and second transparent substrates 10A and 10B are respectively made of a rectangular glass plate or a synthetic resin plate and are mutually opposed apart by a fixed interval. For a method of driving the liquid crystal panel 1, a simple matrix method is adopted and plural perpendicular transparent electrodes 4A vertically extended are formed on the inner surface of the first transparent substrate 10A as clearly shown in FIGS. 1 and 2. In the meantime, plural horizontal transparent electrodes 4B horizontally extended are formed on the inner surface of the second transparent substrate 10B as clearly shown in FIG. 3. These plural horizontal transparent electrodes 4B are divided into two groups of an upper half and a lower half and for the horizontal transparent electrodes 4B in the upper half, each extended part 40 extended by a suitable dimension s8 so that one end in the longitudinal direction of them (the left end in FIG. 3) is protruded from the outside of the liquid crystal inclusion body 12 is formed. In the meantime, for the horizontal transparent electrodes 4B in the lower half, each extended part 40 extended by a suitable dimension s8 so that the other end in the longitudinal direction of them (the right end in FIG. 3) is protruded from the outside of the liquid crystal inclusion body 12 is formed.

Figure 5:
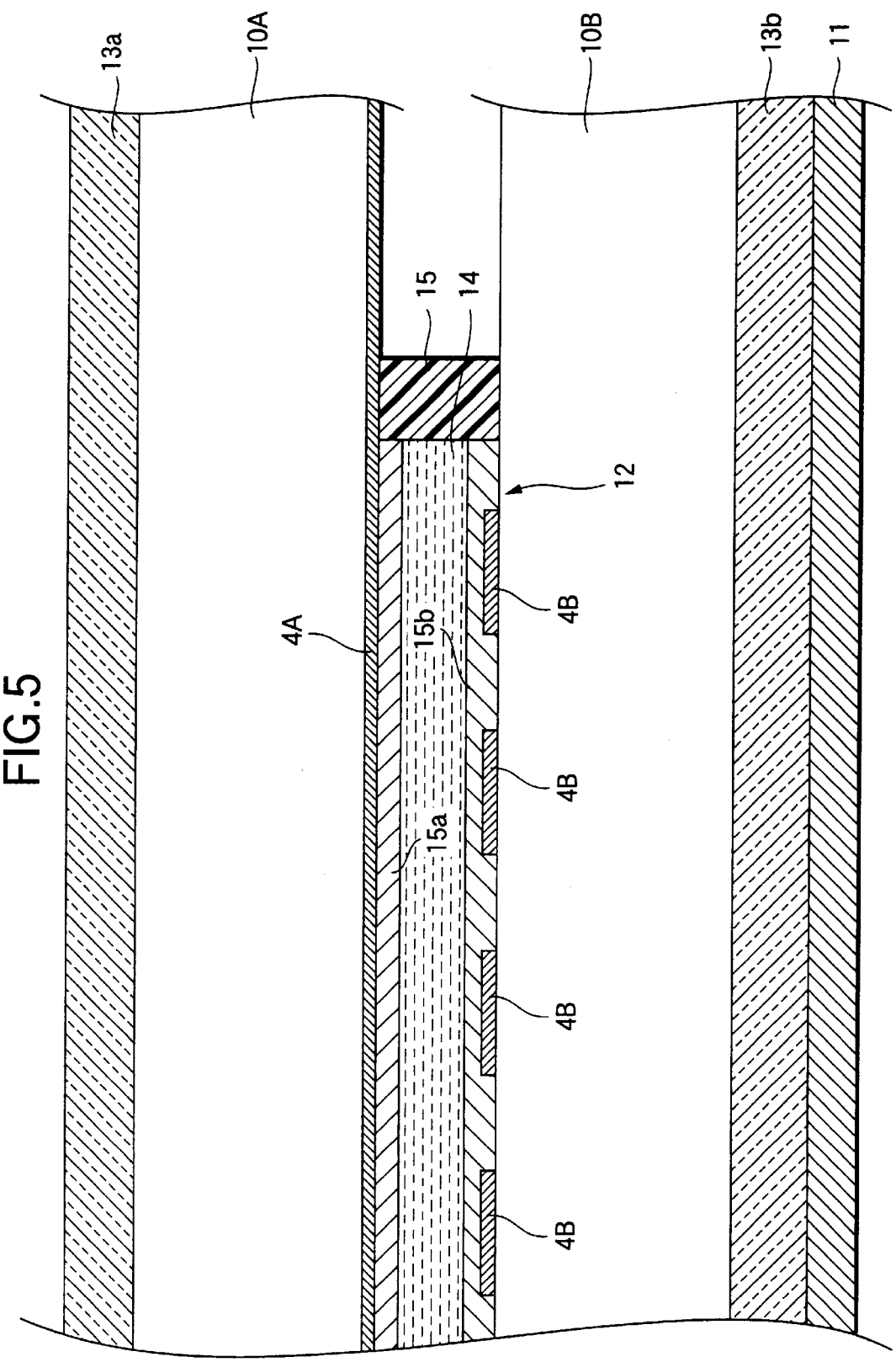
FIG. 5 is an enlarged sectional view showing the main part of a liquid crystal inclusion body.

The liquid crystal inclusion body 12 means a part in which a liquid crystal 14 is sealed in a part enclosed by sealing members 15 between the plural perpendicular transparent electrodes 4A and the plural horizontal transparent electrodes 4B as clearly shown in FIG. 5, and the liquid crystal inclusion body 12 forms a liquid crystal display screen. Orientation films 15a and 15b for applying torsion to a liquid crystal molecule are also provided in a region in which each transparent electrode 4A, 4B of the first and second transparent substrates 10A and 10B is formed. In this embodiment, the liquid crystal panel 1 is for displaying a monochrome image, however, the invention is not limited to this and for example, a color image may be also displayed on a liquid crystal panel by providing a color filter in the liquid crystal inclusion body 12.

As clearly shown in FIGS. 1 and 2, plural segment wiring 41, plural common wiring 42 and plural terminals 43 are formed on the inner surface of the first transparent substrate 10A in addition to the plural perpendicular transparent electrodes 4A according to a pattern and the driver 3 is mounted on the inner surface.

The driver 3 is formed using two IC chips 30a and 30b for example and can control so that the application of voltage to the respective perpendicular transparent electrodes 4A and horizontal transparent electrodes 4B is turned on or off based upon predetermined power and a signal respectively supplied or sent from an external device via the plural terminals 43. The IC chip 30a is provided with a circuit for mainly processing an input signal and in the meantime, the IC chip 30b is provided with a circuit for executing switching operation for turning on or off the application of voltage to the perpendicular transparent electrodes 4A and the horizontal transparent electrodes 4B based upon data processed by the IC chip 30a. Needless to say, in the invention, the IC chips forming the driver 3 may be also integrated into one chip. The driver 3 is arranged at the edge on the lower side of the first transparent substrate 10A under the liquid crystal inclusion body 12 or in the vicinity not to possibly increase the extra space of the first transparent substrate 10A.

Each segment wiring 41 is provided to electrically connect each perpendicular transparent electrode 4A to the driver 3, is directly connected to one end in the longitudinal direction of each perpendicular transparent electrode 4A and is extended from the one end to the driver.

Figure 3:
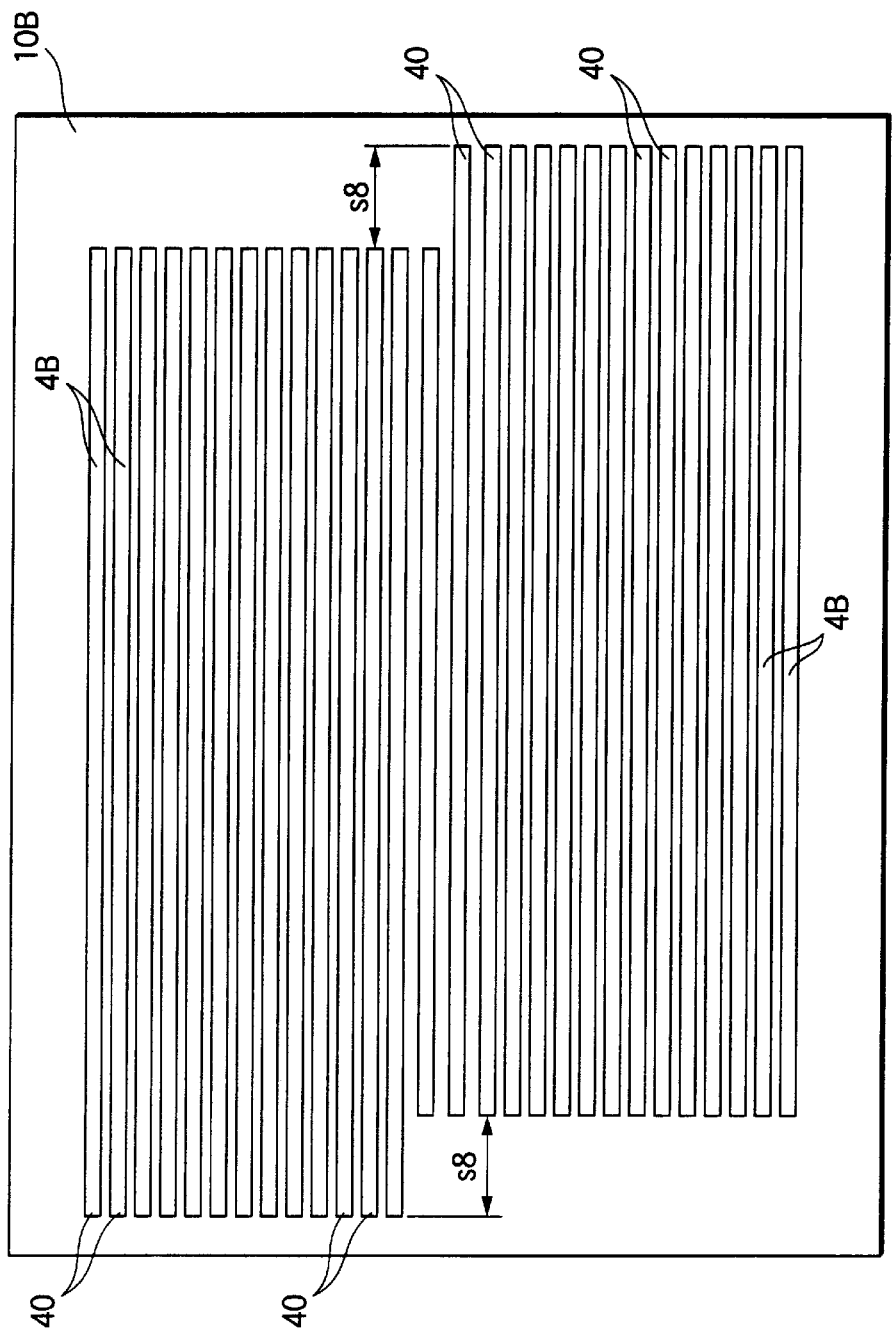
FIG. 3 is a front view showing a second transparent substrate used in the liquid crystal display shown in FIG. 1.

Each common wiring 42 is provided to electrically connect each horizontal transparent electrode 4B to the driver 3 and is extended from a location opposite to the extended part 40 shown in FIG. 3 of each horizontal transparent electrode 4B to the driver 3. More concretely, each common wiring 42 has an intermediate part 42a extended vertically on either right or left side of the liquid crystal inclusion body 12 and an end 42b extended by a fixed dimension in a direction reverse to the liquid crystal inclusion body 12 from the intermediate part 42a, and the end 42b is opposite to a part of the extended part 40 of the horizontal transparent electrode 4B.

Figure 6:
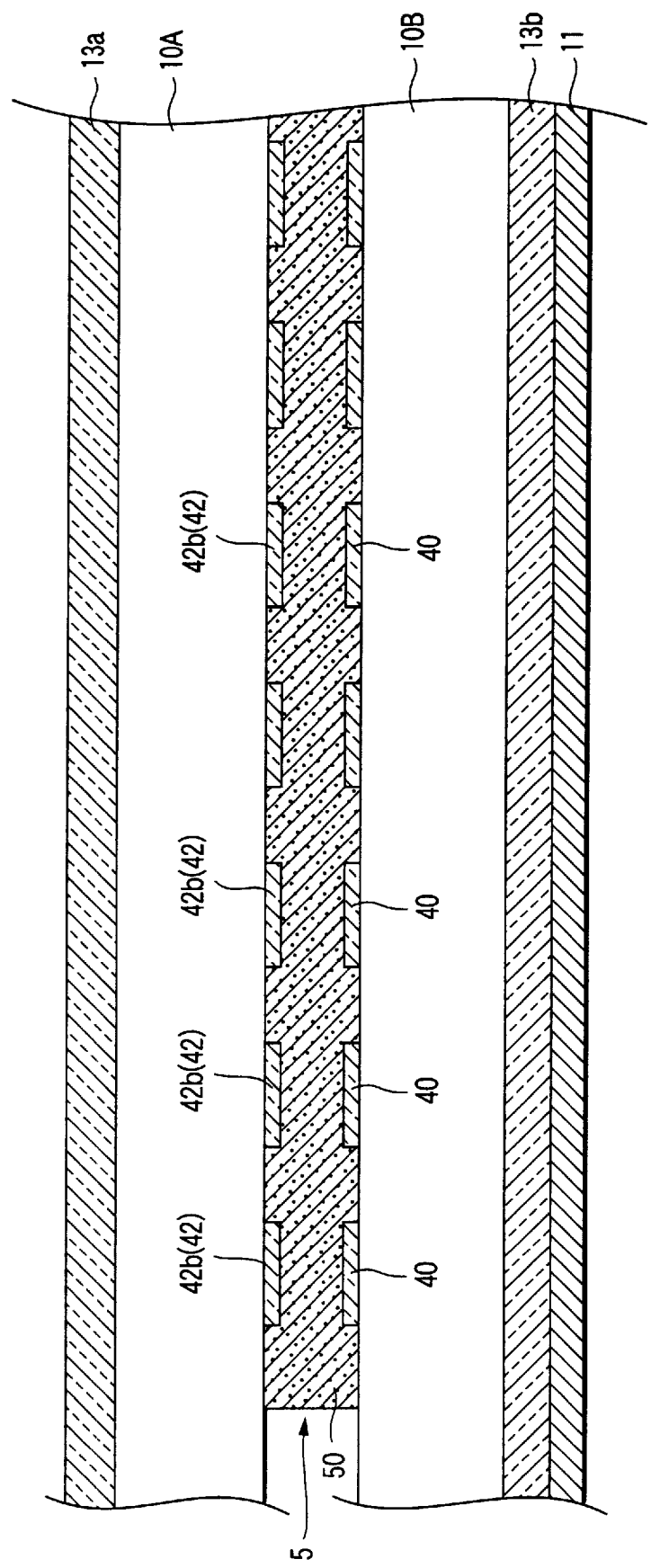
FIG. 6 is an enlarged sectional view viewed along a line VI—VI shown in FIG. 1.

As clearly shown in FIG. 6, a connection 5 is provided between the extended part 40 and the end 42b. The connection 5 electrically connects the extended part 40 and the end 42b of each common wiring 42 by inserting anisotropic conductive paste 50 or an anisotropic conductive film between the first and second transparent substrates 10A and 10B. The anisotropic conductive paste 50 or the anisotropic conductive film enables electric conduction only in a direction in which the extended part 40 and the end 42b are opposite and disables electric conduction in a direction in which plural extended parts 40 and the plural ends 42b are respectively not opposite. Therefore, no electric short-circuit is caused between adjacent extended parts 40 and between adjacent ends 42b. The plural common wiring 42 and the corresponding plural horizontal transparent electrodes 4B are mutually electrically connected by providing such a connection 5. As clearly shown in FIG. 1, each common wiring 42 has configuration that a part of each intermediate part 42a passes a region between the connection 5 and the liquid crystal inclusion body 12 because the end 42b is extended in a direction reverse to the liquid crystal inclusion part 12 from the intermediate part 42a. Each common wiring 42 is made of the same material (for example, ITO) as those of the horizontal transparent electrode 4B and the perpendicular transparent electrode 4A and is transparent.

The plural common wiring 42 are divided into a first group that passes the left side of the liquid crystal inclusion body 12 and a second group that passes the right side and the connection 5 is provided in the right and left two locations of the liquid crystal inclusion body 12. The plural common wiring 42 in the second group are formed except a fixed region on the right side of the driver 3. Hereby, plural terminals 43 are formed on the right side of the driver 3 and are provided substantially in parallel to the driver 3. The plural terminals 43 conduct to a predetermined location of the driver 3 and for a concrete example, there are a terminal for applying voltage, a terminal for connecting to the ground, a terminal for inputting serial data, a terminal for inputting a shift clock of serial data and others.

Next, the action of the liquid crystal display A having the configuration described above will be described.

First, as shown in FIG. 1, each connection 5 is provided in a position apart by predetermined distance s1 from the liquid crystal inclusion body 12 and when the liquid crystal display A is viewed from the front, each connection 5 can be prevented from being seen close to the liquid crystal inclusion body 12. Therefore, in case the liquid crystal display A is used for a display of a mobile telephone, each connection 5 is made substantially invisible when a user sees the liquid crystal inclusion body 12, and the liquid crystal display A and the mobile telephone can be made to look nicer. As each common wiring 42 is transparent as the transparent electrodes 4A and 4B though the intermediate part 42a of each common wiring 42 exists close to the liquid crystal display A, the intermediate part 42a of each common wiring 42 never deteriorates the appearance of the liquid crystal display A.

In the meantime, the intermediate parts 42a of the plural common wiring 42 exist between each connection 5 and the liquid crystal inclusion body 12 and each common wiring 42 is formed so that space between each connection 5 and the liquid crystal inclusion body 12 is effectively utilized. Therefore, differently from a case that each common wiring 42 bulkily exists further outside each connection 5, a death area on the side of the liquid crystal inclusion body 12 can be prevented from being enlarged. As described above, in this liquid crystal display A, the opaque connection 5 is made invisible without increasing a death area and the appearance can be made satisfactory. As the plural common wiring 42 are separated on the right side and the left side of the liquid crystal inclusion body 12, a death area having small width is formed on both right and left sides of the liquid crystal inclusion body 12 so that the death areas have substantially the same width. This is more favorable for enhancing availability in case the liquid crystal display is built in a mobile telephone and others, compared with a case that a large death area is formed on only one side of the liquid crystal inclusion body 12. However, the invention is not limited to this and plural common wiring 42 may be also arranged on only one side of the liquid crystal inclusion body 12.

Figure 11:
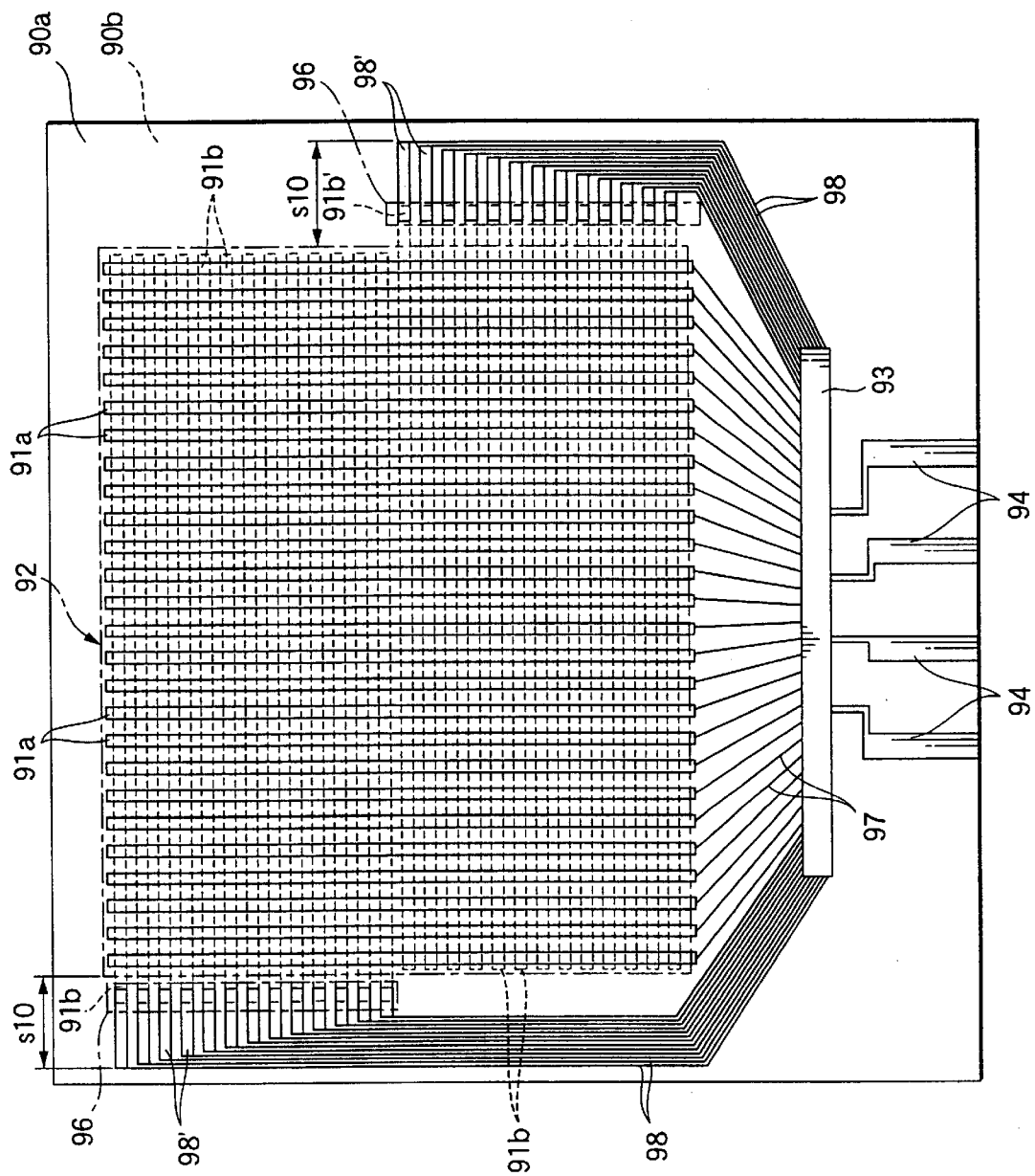
FIG. 11 is a front view showing an example of a conventional type liquid crystal display.
Figure 12:
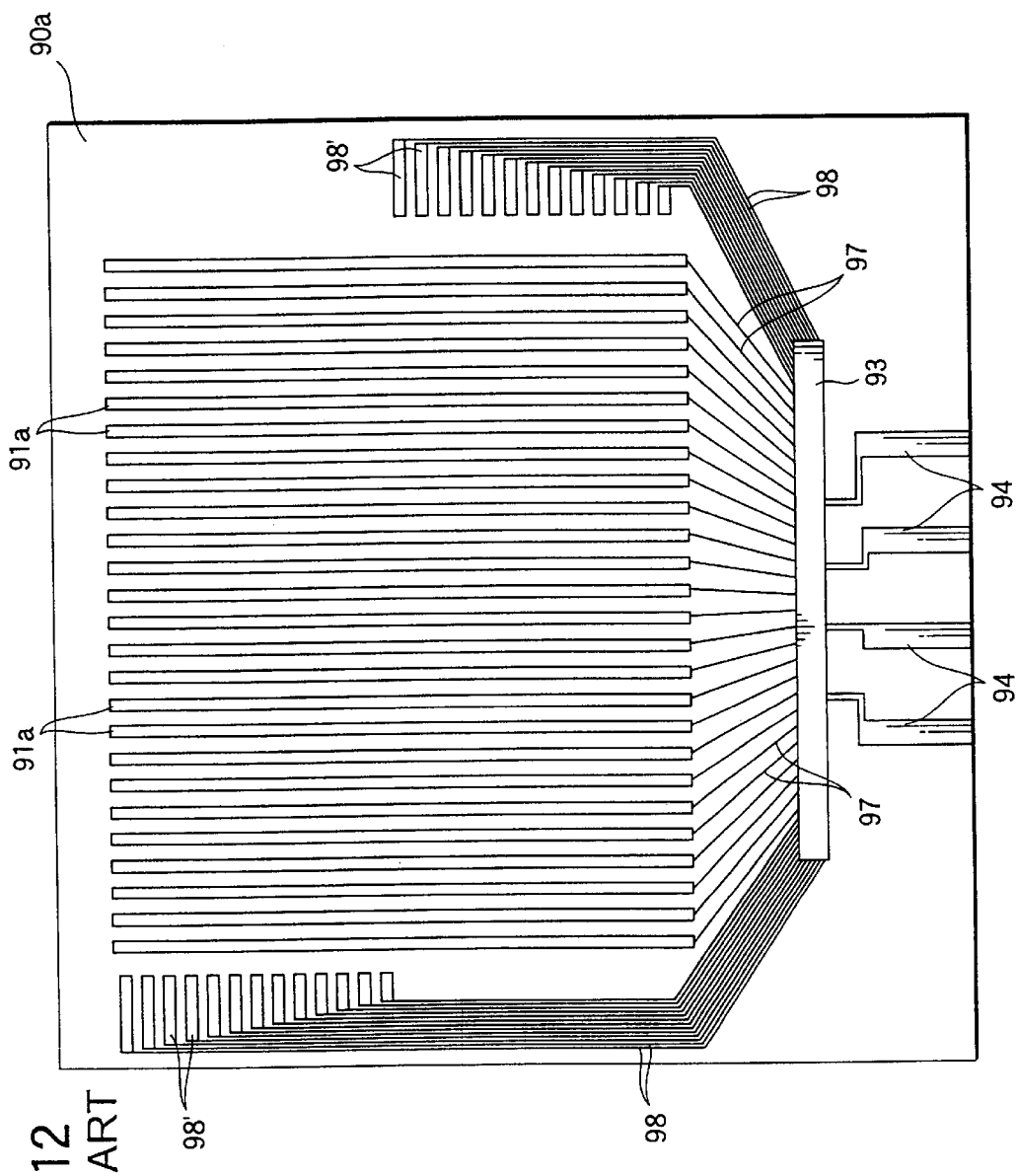
FIG. 12 is a front view showing a first transparent substrate of the liquid crystal display shown in FIG. 11.
Figure 13:
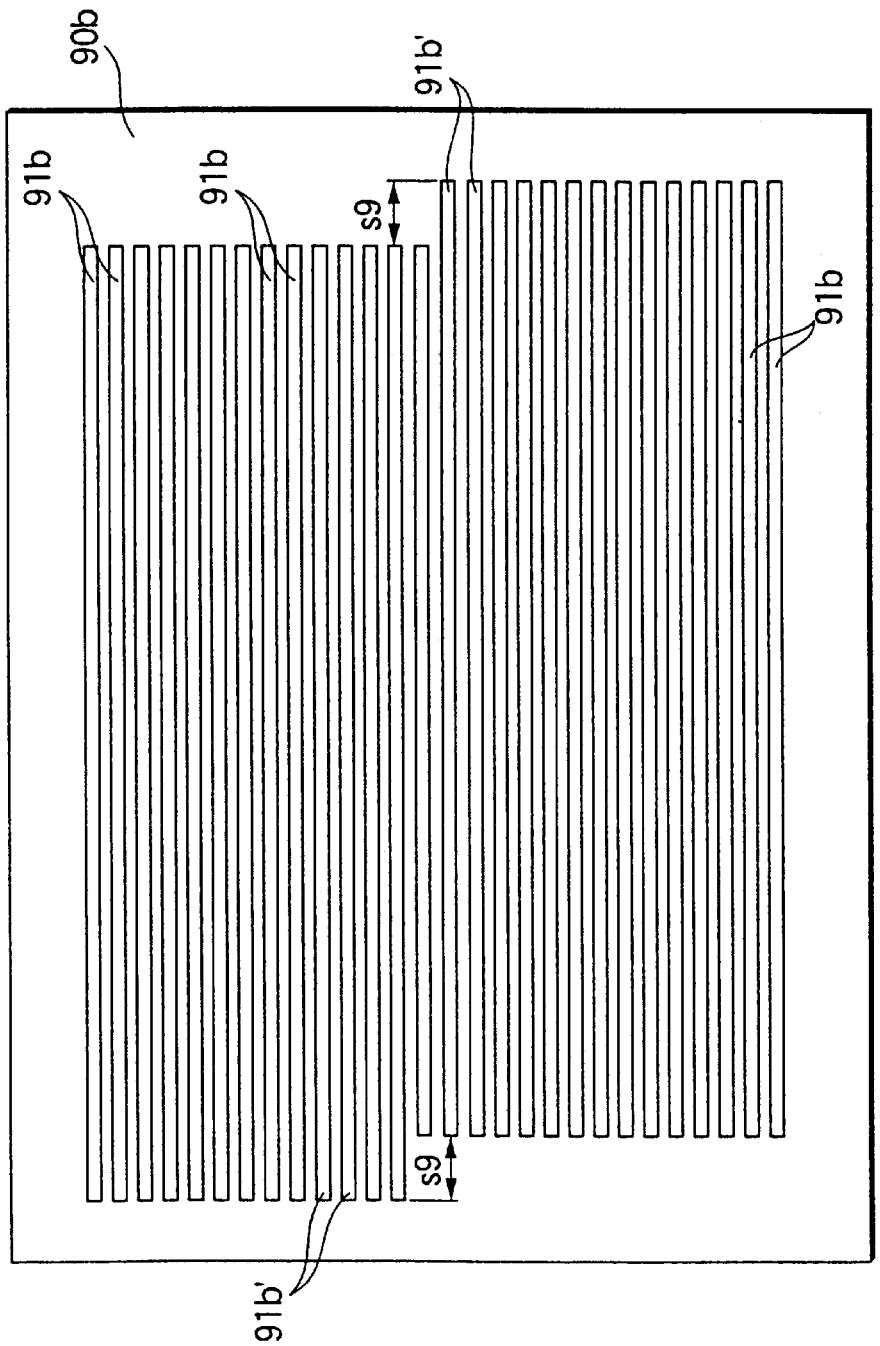
FIG. 13 is a front view showing a second transparent substrate of the liquid crystal display shown in FIG. 11.

In the liquid crystal display A, the driver 3 and the plural terminals 43 are arranged substantially in a row. Therefore, a death area of the liquid crystal display A can be further reduced, compared with a liquid crystal display in which plural terminals are arranged under a driver (a conventional type shown in FIG. 11 for example). As described above, when the death area is reduced, the liquid crystal screen can be large-sized, inhibiting the whole large-sizing of the liquid crystal display.

The liquid crystal display A is formed as a translucent liquid crystal display using a backlight method. Therefore, as shown in FIG. 4, when light emitted from the light source 20 of the luminaire 2 is transmitted toward the liquid crystal panel 1 from the back of the liquid crystal panel 1 utilizing the light conducting plate 21, the light is transmitted toward the front of the liquid crystal panel 1 after the light is transmitted in the translucent reflector 11 and is transmitted in the liquid crystal inclusion body 12 and hereby, liquid crystal display is performed. In the meantime, in case no light is emitted from the light source 20, natural light outside the front of the liquid crystal panel 1 is reflected by the translucent reflector 11 after the natural light is transmitted in the liquid crystal inclusion body 12 from the front of the liquid crystal panel 1, afterward, the natural light is transmitted again in the liquid crystal inclusion body 12 and is transmitted in front of the liquid crystal panel 1. Therefore, in this case, liquid crystal display is also performed.

FIGS. 7 to 10 show another embodiments of the invention. In these drawings, the same reference number as in the embodiment is allocated to the same or the similar element as/to that in the embodiment.

Figure 7:
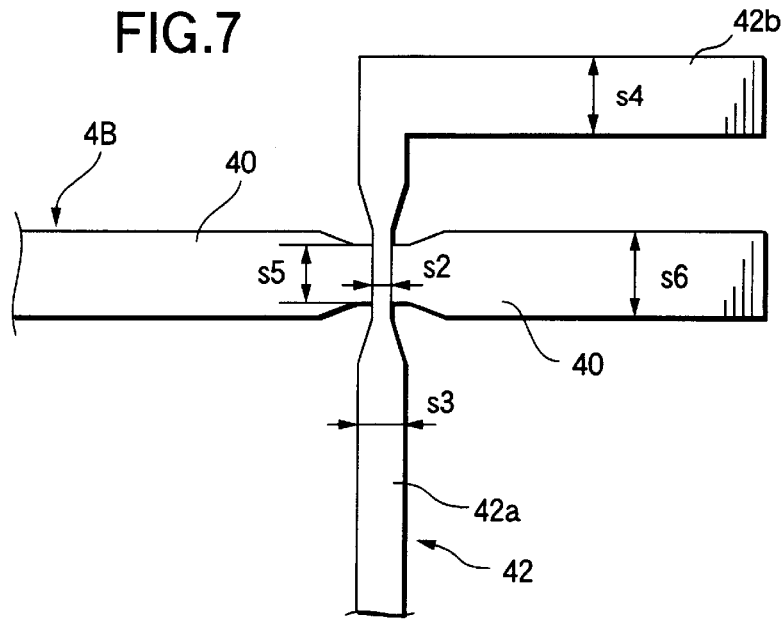
FIG. 7 is an explanatory drawing for explaining the main part showing another example of common wiring and an extended part.

In configuration shown in FIG. 7, the width s2 of a part opposite to the extended part 40 of the horizontal transparent electrode 4B of the intermediate part 42a of the common wiring 42 is made smaller than the width s3 of the of the other part of the intermediate part 42a and the width s4 of the end 42b. Similarly, the width s5 of a part opposite to the intermediate part 42a of the extended part 40 of the horizontal transparent electrode 4B is made smaller than the width s6 of the other part of the extended part 40. As understood from FIG. 1, in the liquid crystal display A, as the intermediate parts 42a of the plural common wiring 42 cross the plural extended parts 40, the intermediate parts 42a of the common wiring 42 and the extended parts 40 are mutually opposite at plural locations. In the meantime, as a malfunction occurs in the liquid crystal display when electric conduction is caused in parts in which the intermediate parts 42a and the extended parts 40 are mutually opposite, such electric conduction is required to be securely prevented. In the meantime, as shown in FIG. 7, in case the width of a part in which the intermediate part 42a and the extended part 40 are mutually opposite is reduced, unjust electric conduction can be prevented more by the quantity in which the opposite area is reduced from occurring in the part. Therefore, in case an interval between the intermediate part 42a of the common wiring 42 and the extended part 40 is minute, it is favorable to adopt the structure shown in FIG. 7 so as to prevent a malfunction of the liquid crystal display A.

Figure 8:
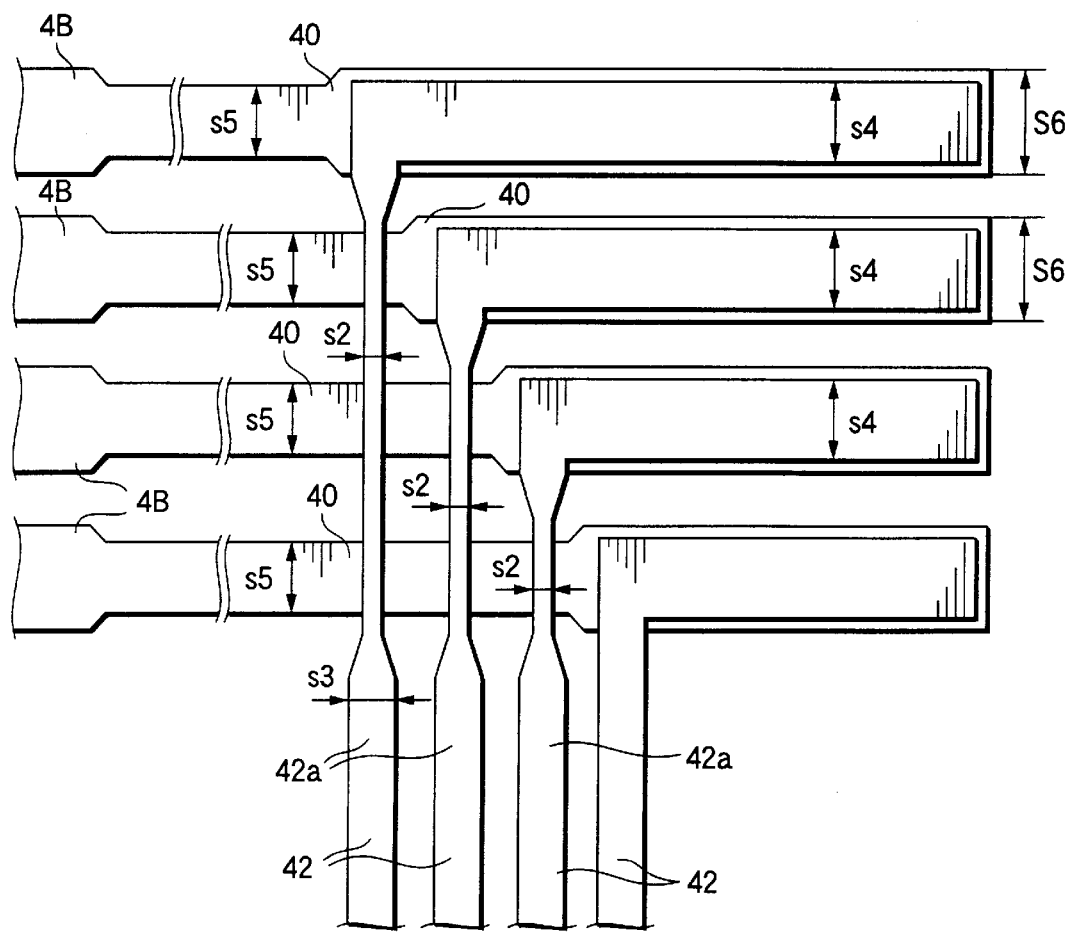
FIG. 8 is an explanatory drawing for explaining the main part showing another example of the common wiring and the extended part.

In configuration shown in FIG. 8, the width s2 of a region having a predetermined dimension of the intermediate part 42a of each common wiring 42 and extended across the extended part 40 of the horizontal transparent electrode 4B is made smaller than the width s3 of the other part of the intermediate part 42a and the width s4 of the end 42b. Similarly, the width s5 of a region having a predetermined dimension of the extended part 40 of each horizontal transparent electrode 4B and crossed by the plural intermediate parts 42a is made smaller than the width s6 of the other part of the extended part 40. The width s4 of the end 42b of each common wiring 42 and the width s6 of the extended part 40 have substantially the same dimension, however, in FIG. 8, to clearly draw the extended part 40, the width s5 is shown wider than the width s4. In the configuration shown in FIG. 8, as in the configuration shown in FIG. 7, the area of each part in which the plural intermediate parts 42a and the plural extended parts 40 are respectively mutually opposite can be also reduced and unjust electric conduction can be also prevented from being caused between them. Multiple parts in which the plural intermediate parts 42a and the plural extended parts 40 are respectively mutually opposite exist and when only the width of the part in which the intermediate part 42a and the extended part 40 are opposite is reduced as shown in FIG. 7, the form of the intermediate part 42a and the extended part 40 becomes considerably complex. In the meantime, in case means shown in FIG. 8 is adopted, the form of the intermediate part 42a of the extended part 40 can be simplified and the pattern formation is facilitated.

Figure 9A:
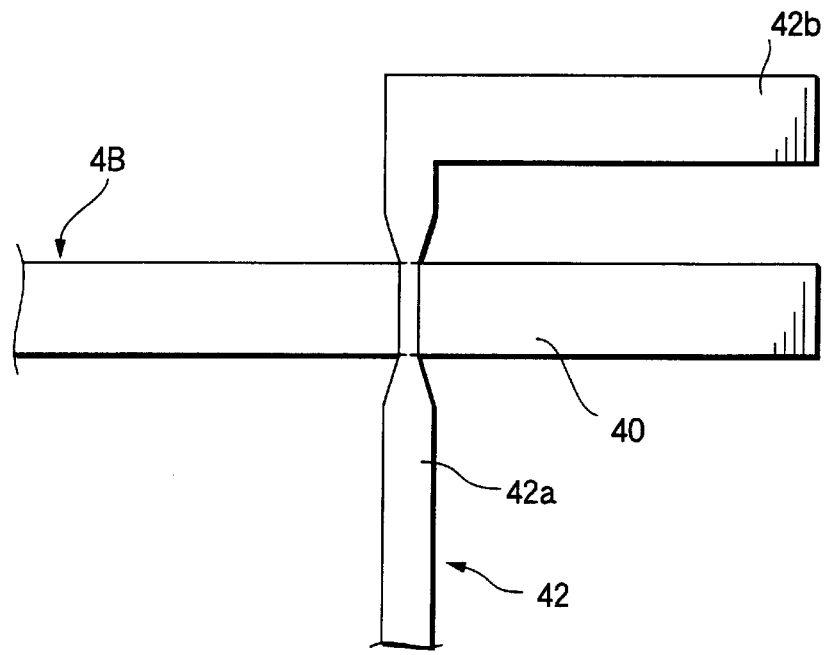
FIGS. 9A and 9B are explanatory drawings for explaining the main part showing another examples of the common wiring and the extended part.
Figure 9B:
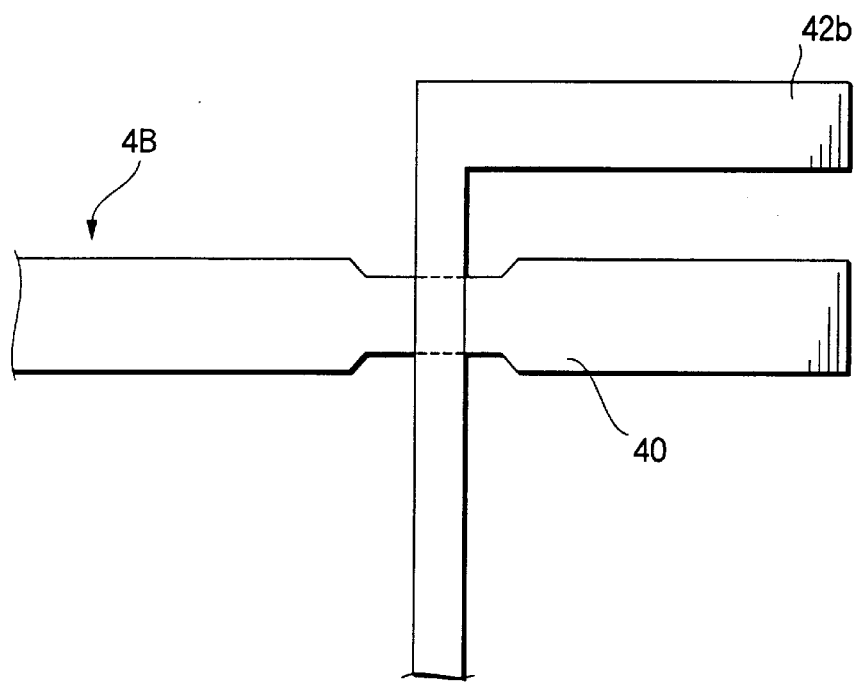

For means for reducing the area of the part in which the intermediate part 42a and the extended part 40 are opposite, it is desirable that both the intermediate part 42a and the extended part 40 in the opposite part are thinned, however, the invention is not limited to this case. In the invention, as shown in FIG. 9A, only the intermediate part 42a is thinned or as shown in FIG. 9B, only the extended part 40 can be also thinned. It is desirable that the width of the intermediate part 42a in a part opposite to the extended part 40 is smaller than that of the other part of the intermediate part 42a, however, the invention is not limited to this and if only the width of the intermediate part 42a in the part opposite to the extended part 40 is smaller than the width of the end 42b, effect to prevent unjust electric conduction is acquired. Similarly, if only the width of the extended part 40 in a part opposite to the intermediate part 42a is smaller than the width of the extended part 40 in a part opposite to the end 42b, effect to prevent unjust electric conduction is acquired.

Figure 10:
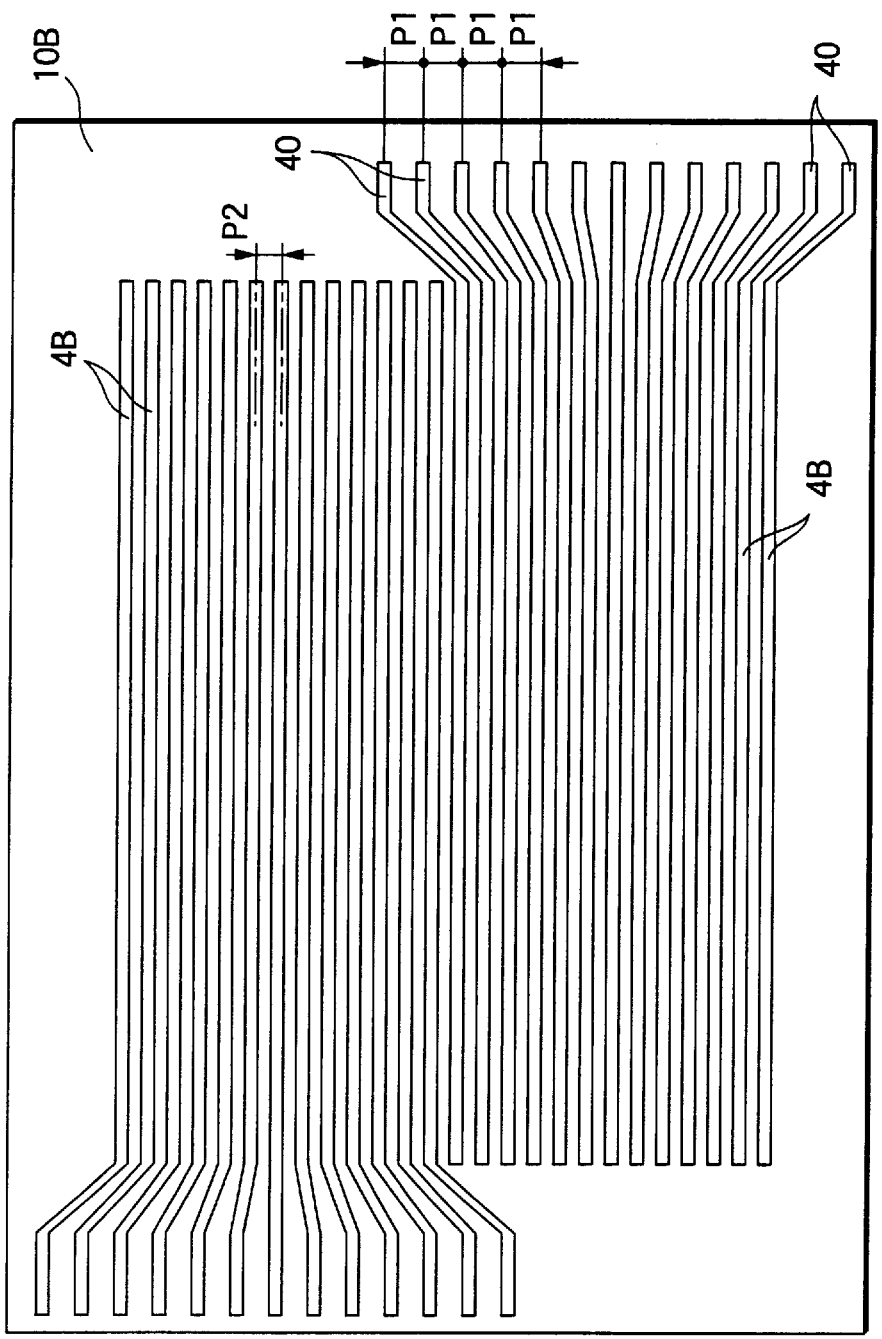
FIG. 10 is a front view showing another example of the extended part.

In configuration shown in FIG. 10, the array pitch P1 of the ends of the plural extended parts 40 is made larger than the array pitch P2 of the plural horizontal transparent electrodes 4B. Though the following array pitch is not shown in FIG. 10, the array pitch of the ends 42b of the plural common wiring 42 which conduct electricity to each end of the extended parts 40 is equal to the array pitch P1. According to such configuration, in case the plural extended parts 40 and the ends 42b of the plural common wiring 42 are electrically connected, it is facilitated and is secured to prevent the respective adjacent parts of the plural extended parts 40 and the plural ends 42b from conducting electricity.

The concrete configuration of each part of the liquid crystal display according to the invention is not limited to that in the embodiments described above and the design may be variously varied.

In the embodiments, the case that the perpendicular transparent electrodes 4A are formed on the first transparent substrate 10A and the horizontal transparent electrodes 4B are formed on the second transparent substrate 10B is described as the concrete example, however, the invention is not limited to this case. In the invention, to the contrary, horizontal transparent electrodes may be also formed on a first transparent substrate and perpendicular transparent electrodes may be also formed on a second transparent substrate. In this case, an extended part and segment wiring provided to the first transparent substrate are electrically connected via a connection by providing the extended part to each perpendicular transparent electrode of the second transparent substrate.

In the invention, an illuminating method, the concrete type of a liquid crystal, the concrete size of a liquid crystal screen and the display capacity of an image (the concrete number of transparent electrodes, common wiring and segment wiring) are also not limited. The driver can be also separated into a driver for perpendicular transparent electrodes and a driver for horizontal transparent electrodes. For an illuminating method, a frontlight method can be also adopted in place of the backlight method. In the invention, two-screen driving that the liquid crystal display screen is divided into upper and lower halves may be also performed by respectively providing a driver to upper and lower liquid crystal inclusion bodies.

What is claimed is:

1. A liquid crystal display, comprising:
   a liquid crystal inclusion body formed by sealing a liquid crystal between first and second transparent substrates on which plural transparent electrodes are respectively formed;
   at least one driver mounted on the first transparent substrate;
   plural extended parts in which the end of each transparent electrode formed on the second transparent substrate is extended outside the liquid crystal inclusion body;
   plural wiring provided to the first transparent substrate and extended from a location opposite to each extended part to the driver; and
   a connection for electrically connecting these plural wiring to the plural extended parts, wherein:
   a part of each wiring passes between the connection and the liquid crystal inclusion body.

2. A liquid crystal display according to claim 1, wherein:
   each wiring has an intermediate part extended in a direction in which the each wiring crosses the plural extended parts and an end extended in direction reverse to the liquid crystal inclusion body from the intermediate part; and
   the connection is provided by inserting a conductive substance between the end and each extended part.

3. A liquid crystal display according to claim 2, wherein:
   the width of a part at least opposite to each extended part of the intermediate part of each wiring is made smaller than the width of the end of each wiring.

4. A liquid crystal display according to claim 2, wherein:
   the width of a part at least opposite to the intermediate part of each wiring of each extended part is made smaller than the width of a part opposite to the end of each wiring.

5. A liquid crystal display according to claim 1, wherein:
   the array pitch of electrically connected parts of the plural extended parts and the plural wiring is made larger than the array pitch of transparent electrodes formed on the second transparent substrate.

6. A liquid crystal display according to claim 1, wherein:
   plural transparent electrodes formed on the second transparent substrate are divided into a first group in which each one end in the longitudinal direction of them is the extended part and a second group in which each other end in the longitudinal direction of them is the extended part.

7. A liquid crystal display according to claim 1, wherein:
   the driver is provided in a position apart from the liquid crystal inclusion body in a fixed direction;
   the plural wiring are provided except a region on one side of the driver in a direction perpendicular to the fixed direction; and
   plural terminals for receiving a signal and power respectively input to the driver from an external device are provided in the region.

8. A liquid crystal display according to claim 1, wherein:
   the transparent electrodes form a conductive pattern in the shape of a stripe at a predetermined interval;
   the transparent electrodes on the first transparent substrate and the transparent electrodes on the second transparent substrate are formed so that they are mutually perpendicular;
   the plural wiring are arranged at both ends of the first transparent substrate so that they are parallel to the transparent electrodes on the first transparent substrate; and
   the connection is extended to the transparent electrodes so that it is perpendicular to the plural wiring.

9. A liquid crystal display according to claim 8, wherein:
   the plural extended parts have the same width as that of the pattern of the transparent electrodes on the second transparent substrate and are formed in the same direction as the pattern of the transparent electrodes.

10. A liquid crystal display according to claim 8, wherein:
    the plural extended parts have the same width as that of the pattern of the transparent electrodes on the second transparent substrate and the pattern pitch is continuously formed so that it is gradually wider than the pattern pitch of the transparent electrodes.

11. A liquid crystal display according to claim 9, wherein:
    the plural extended parts are respectively connected to the connection via a band of anisotropic conductive film stuck in a direction perpendicular to the extended parts in the vicinity of the ends.

12. A liquid crystal display according to claim 10, wherein:
    the plural extended parts are respectively connected to the connection via a band of anisotropic conductive film stuck in a direction perpendicular to the extended parts in the vicinity of the ends.

* * * * *